(12) United States Patent
Prabhu

(10) Patent No.: US 10,819,577 B2
(45) Date of Patent: Oct. 27, 2020

(54) NODE UPDATE IN A SOFTWARE-DEFINED NETWORK

(71) Applicant: Cisco Technology, Inc., San Jose, CA (US)

(72) Inventor: Vinay Prabhu, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 62 days.

(21) Appl. No.: 16/040,282

(22) Filed: Jul. 19, 2018

(65) Prior Publication Data

US 2019/0036781 A1    Jan. 31, 2019

Related U.S. Application Data

(60) Provisional application No. 62/539,487, filed on Jul. 31, 2017.

(51) Int. Cl.
| | |
|---|---|
| *G06F 15/177* | (2006.01) |
| *H04L 12/24* | (2006.01) |
| *G06F 8/65* | (2018.01) |
| *H04L 29/08* | (2006.01) |

(52) U.S. Cl.
CPC ............ *H04L 41/0893* (2013.01); *G06F 8/65* (2013.01); *H04L 41/082* (2013.01); *H04L 41/12* (2013.01); *H04L 67/12* (2013.01); *H04L 67/34* (2013.01); *H04L 67/10* (2013.01)

(58) Field of Classification Search
CPC ......... H04L 67/10; H04L 67/12; H04L 65/80; H04L 65/403; H04L 65/1046
See application file for complete search history.

(56) References Cited

U.S. PATENT DOCUMENTS

| | | | |
|---|---|---|---|
| 9,276,877 B1 * | 3/2016 | Chua | H04L 45/02 |
| 9,626,177 B1 * | 4/2017 | Madduri | G06F 8/65 |
| 2016/0065696 A1 * | 3/2016 | Corden | H04L 69/08 |
| | | | 370/410 |
| 2018/0182489 A1 * | 6/2018 | Harma | G16H 40/63 |

* cited by examiner

*Primary Examiner* — Yves Dalencourt
(74) *Attorney, Agent, or Firm* — Polsinelli PC

(57) ABSTRACT

A method may include identifying an update file for a plurality of nodes; selecting a first set of nodes of the plurality of nodes based on a set of node selection criteria; sending the update file to the first set of nodes via a software-defined network (SDN); receiving a first message from a first node of the first set of nodes indicating that the first node is ready to host the update file; identifying a second node that is connected to the first node responsive to receiving the first message from the first node; sending a first instruction to the second node for the second node to obtain the update file from the first node; receiving a second message from the second node indicating that the second node is ready to host the update file; and adding the second node to the first set of nodes.

20 Claims, 5 Drawing Sheets

NODE UPDATE IN A SOFTWARE-DEFINED NETWORK

CROSS REFERENCE TO RELATED APPLICATIONS

This application claims priority to U.S. Patent App. No. 62/539,487, filed on Jul. 31, 2017, which is hereby incorporated by reference in its entirety.

FIELD

The embodiments discussed in the present disclosure are related to a node update in a software-defined network.

BACKGROUND

The use of networks is a useful tool in allowing communication between distinct computing devices. Despite the proliferation of computers and networks over which computers communicate, there still remains various limitations to current network technologies.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that may include identifying an update file for a plurality of nodes; selecting a first set of nodes of the plurality of nodes based on a set of node selection criteria; sending the update file to the first set of nodes via a software-defined network (SDN); receiving a first message from a first node of the first set of nodes indicating that the first node is ready to host the update file; identifying a second node that is connected to the first node responsive to receiving the first message from the first node; sending a first instruction to the second node for the second node to obtain the update file from the first node; receiving a second message from the second node indicating that the second node is ready to host the update file; and adding the second node to the first set of nodes.

One or more embodiments of the present disclosure may additionally include systems and/or non-transitory computer readable media for facilitating the performance of such methods.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments of the present disclosure relate to improvements to the operation of networks. For example, some networks, such as software-defined networks, may include a large number of nodes. From time to time, these software on these nodes may be updated. Typically, upgrade of software across a network may be controlled and sourced by a centralized engine. This approach may have some drawbacks which may be amplified in networks with a large number of nodes (e.g., networks with hundreds or thousands of nodes, or more). Since these systems typically use a single centralized engine, a bottleneck is created at the centralized engine as the centralized engine pushes out software updates to the nodes in the network. And, under this approach, it may take large networks weeks or even months to update software on all of the nodes. Further drawbacks include a causing a limit on a number of parallel downloads, which may adversely affect a time required for a change window, such as weeks or months as mentioned above. Further, these approaches may introduce other problems to the network when some of the nodes are updated and others are not. This may cause state issues and other problems as nodes in the network are running different software or different versions of software. Another drawback of the single centralized engine approach is that it is a single point of failure for file transfer with no redundancy.

Aspects of the present disclosure address these and other shortcomings by providing improved node updates in a software-defined network. Embodiments of the present disclosure may provide improvements to computer networks and to the operation of computers themselves. For example, using one or more embodiments of the present disclosure, the disclosed system and techniques may provide enhanced capabilities to large-scale networks, such as faster software upgrades to a large number of nodes that may be geographically distributed over a large area. Further, the disclosed system and techniques may allow efficient use of resources, such as bandwidth and hardware, without compromising redundancy. The disclosed system and techniques may help in large scale network design and maintenance and may provide protection from brown/black outs.

Embodiments of the present disclosure are explained with reference to the accompanying drawings.

Figure 1:
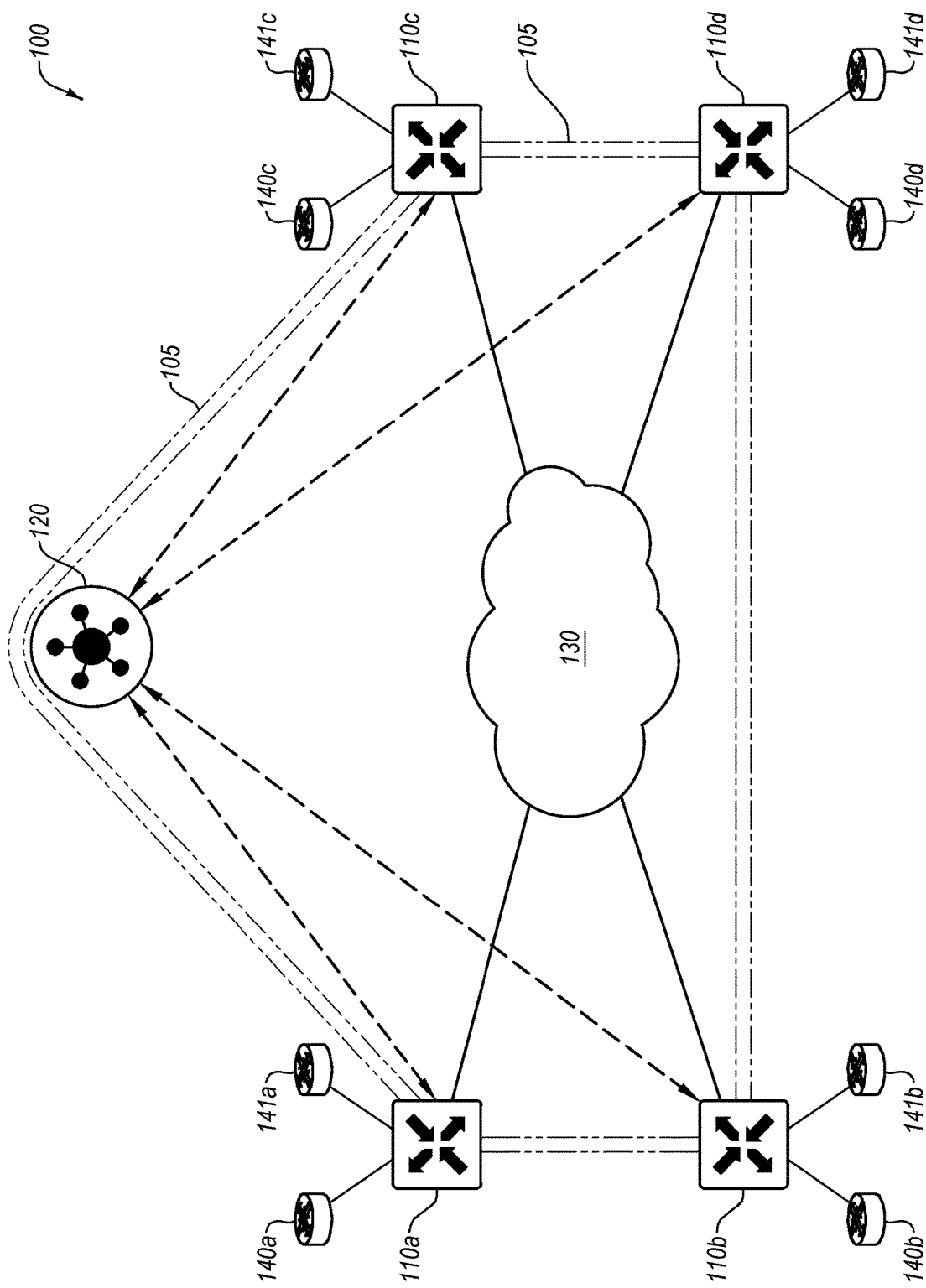
FIG. 1 illustrates an example system of network components implementing a software-defined network (SDN)

FIG. 1 illustrates an example system 100 of network components implementing a software-defined network (SDN), in accordance with one or more embodiments of the present disclosure. The SDN may include any type of network or network topology. For example, the SDN may include a software-defined wide area network (SD-WAN), software-defined local area network (LAN), software-defined metropolitan area network (MAN), or any other type of network. The system 100 may include an internal network domain 105 and one or more external network domains. The system 100 may include one or more edge network devices 110 (such as the edge network devices 110a-110d), one or more control devices 120, a communication network 130, and external network devices 140 and 141 (such as the external network devices 140a-140d and 141a-141d).

For ease and clarity in explanation, some examples of the present disclosure are described with respect to a WAN where the network is managed at least partially by software rather than controlled by hardware. As such, the SDN may support multiple types of connections or communication links, such as the Internet, MultiProtocol Label Switching (MPLS) connections, and/or cellular connections (such as Long Term Evolution (LTE), LTE Advanced, Worldwide Interoperability for Microwave Access (WiMAX), Evolved High Speed Packet Access (HSPA+), and/or others). Additionally, the SDN may support load balancing or load sharing between the various connections. Further, because of the distributed nature of some networks, the SDN may support virtual private networks (VPNs), firewalls, and other security services. In an SD-WAN, for example, a control plane may be functionally separated from the physical topology. In some embodiments, the SDN may separate the control plane of the network (to be managed via software) from a data plane of the network (operating on the hardware of the network). As used herein, the term control plane may refer to communications and connections used in the control and administration of a network itself, rather than the transmission of data through the network, which may occur at the data plane. As used herein, the term data plane may refer to communications and connections used in the transmission and reception of data through the network. For example, the control plane may include administrative traffic directed to a network device within a network, while the data plane may include traffic that passes through network devices within the network.

In some embodiments, the one or more control devices 120 may be configured to manage the control plane of an internal network domain 105 by directing one or more aspects of the operation of the edge network devices 110. For example, the one or more control devices 120 may generate and/or distribute policies to one or more of the edge network devices 110. A policy may include a rule or set of rules bearing on the handling of network traffic, such as routing, priority, media, etc. The internal network domain 105 may operate as a secured and controlled domain with specific functionality and/or protocols. In some embodiments, the edge network devices 110 may handle data traffic based on one or more policies created and/or propagated by the one or more of the control devices 120. In these and other embodiments, the edge network devices 110 may route data traffic within the internal network domain 105 based on the policies created and/or propagated by the one or more of the control devices 120.

In some embodiments, the one or more control devices 120 may form a control plane connection with some or all of the edge network devices 110. The control plane connection may facilitate the exchange of data between the edge network devices 110 and the one or more control devices 120 for management and control of the internal network domain 105. The control plane connection may operate via a tunnel through the communication network 130, such as a Datagram Transport Layer Security (DTLS) tunnel. In some embodiments, data transmitted over the control plane connection may facilitate the one or more control devices 120 determining topology of the communication network 130. For example, the one or more control devices 120 may communicate with the edge network devices 110 to determine what physical connections exist between and among the edge network devices 110 in the communication network 130. Additionally or alternatively, data transmitted over the control plane connection may facilitate the one or more control devices 120 determining available, optimal or desired paths across the communication network 130 between and among the edge network devices 110. Additionally or alternatively, data transmitted over the control plane connection may facilitate the edge network devices 110 determining available, optimal or desired paths across the communication network 130 between and among the edge network devices 110. Additionally or alternatively, the one or more control devices 120 may communicate route information and/or hub ID configuration preference messages to the edge network devices 110 over the control plane connection. In these and other embodiments, the control plane connection may include a semi-permanent connection between the one or more control devices 120 and the edge network devices 110 such that if the connection between a particular control device 120 and a given edge network device 110 is broken, the edge network device 110 may connect to another control device.

The one or more control devices 120 may facilitate software updates for one or more nodes in the network 110. The nodes many include the edge network devices 110, the control devices 120, or any other device in the system 100. To facilitate a software update, the one or more control devices 120 may select a first set of nodes as an "Alpha" set of nodes that may be the first set of nodes to be updated. Once the "Alpha" nodes are updated, the "Alpha" nodes may be used to propagate the software updated to other nearby "Beta" nodes. Once the "Beta" nodes are updated, some or all of the "Beta" nodes may become "Alpha" nodes, which may continue to propagate the software update through the system 100. Further details on the selection of the "Alpha" nodes and the "Beta" nodes, as well as further details on the software update process are further described in conjunction with FIGS. 3-4.

In some embodiments, the one or more of the control devices 120 may maintain a central route table that stores route information within the internal network domain 105 and/or hub ID configuration preferences for various nodes in the system. For example, the one or more of the control devices 120 may communicate with various edge network devices 110 to determine the physical and/or logical connections available to the edge network devices 110 through the communication network 130. In some embodiments, the edge network devices 110 may include one or more physical and/or logical connections to each other. In these and other embodiments, the one or more of the control devices 120 may generate and/or update one or more policies in conjunction with the central route table to help the edge network devices 110 to determine data traffic routes through the internal network domain 105. For example, the one or more of the control devices 120 may provide policies and other configuration preferences related to traffic flows to the edge network devices 110 rather than being involved with every individual flow through the internal network domain 105. In these and other embodiments, the one or more control devices 120 may generate and/or update one or more hub ID configuration preferences in conjunction with the central route table to help the edge network devices 110 to determine connectivity to different nodes through the internal network domain 105. For example, the one or more of the control devices 120 may provide hub ID configuration preference messages related to connectivity to the edge network devices 110 rather than being involved with every individual connection or disconnection between nodes in the system 100.

In some embodiments, the one or more of the control devices 120 may receive one or more keys from the edge network devices 110 used in communication of data over the data plane. For example, one or more data packets may use one or more keys for security purposes in transmitting data from one edge network device 110 to another edge network device 110. In these and other embodiments, the one or more of the control devices 120 may reflect the received keys to one or more other edge network devices 110 that may be in the traffic flow based on the central route table and/or the policies implemented by the one or more of the control devices 120. In these and other embodiments, a given edge network device 110 may generate symmetrical keys to facilitate secure communication between edge network devices. In these and other embodiments, a pair of symmetrical keys may be generated by the given edge network device 110, with one remaining with the given edge network device 110 and the other provided to the one or more of the control devices 120 such that the one or more of the control devices 120 may distribute the other symmetrical key to other edge network devices that communicate with the given edge network device 110. In such a way, each edge network device that is to communicate with the given edge network device 110 based on the policies of the one or more of the control devices 120 may receive the symmetrical key.

In some embodiments, traffic within the internal network domain 105 may be encrypted, such as with two-way authentication using Advanced Encryption Standard (AES) with a 256-bit length key over one or more Datagram Transport Layer Security (DTLS) and/or Transport Layer Security (TLS) connections between edge network devices 110.

In some embodiments, the one or more of the control devices 120 may store authentication information for one or more (or all) of the edge network devices 110 within the internal network domain 105. In these and other embodiments, a device may be prevented from communicating within the internal network domain 105 unless the device has authentication information that matches or otherwise corresponds to the stored authentication information of the one or more of the control devices 120. In some embodiments, the authentication information may be used when the edge network devices 110 first come on line to establish the control plane connection, and any device without a control plane connection with the one or more of the control devices 120 may be prevented from communicating within the internal network domain 105.

The edge network devices 110 may operate at a boundary of the internal network domain 105. The edge network devices 110 may include one or more physical and/or logical connections that may operate within the internal network domain 105. Such connections may be illustrated as part of the communication network 130. Additionally or alternatively, the edge network devices 110 may include one or more physical and/or logical connections operating outside of the internal network domain 105. For example, the edge network devices 110 may be connected to the external network device(s) 140 and/or 141.

In some embodiments, the edge network devices 110 may operate to route traffic from associated external network devices 140 and 141 into the internal network domain 105. Additionally or alternatively, the edge network devices 110 may operate to route traffic from the internal network domain 105 to the associated external network devices 140 and 141. In some embodiments, the edge network devices 110 may communicate with associated external network devices 140 and 141 using typical communication protocols, such as Open Shortest Path First (OSPF), Border Gateway Protocol (BGP), Virtual Router Redundancy Protocol (VRRP), Bi-directional Forwarding Detection (BFD), among others. Additionally or alternatively, the edge network devices 110 may support other network functionalities such as differentiated services code point (DSCP) tagging or type of service (TOS) tagging, Quality of Service (QoS) monitoring, Service Level Agreements (SLA), Internet Protocol (IP) forwarding, Internet Protocol Security (IPsec), Access Control Lists (ACL), among others.

In some embodiments, the edge network devices 110 may locally maintain one or more route tables. In some embodiments, the edge network devices 110 may adjust or modify the route tables based on one or more policies sent from the one or more of the control devices 120. For example, one or more entries may be removed, discarded, or otherwise not added to the route tables by the edge network devices 110 based on the one or more policies. In some embodiments, the edge network devices 110 may include logic to update, modify, and/or generate the route tables based on policies from the one or more of the control devices 120 and/or from traffic handled by the edge network devices 110. The one or more route tables may be automatically populated by the edge network devices 110 based on direct interface routes, static routes, and/or dynamic routes learned using one or more network protocols such as BGP and/or OSPF. In some embodiments, routing decisions for data outside of the internal network domain 105 may be performed by a particular edge network device 110 without specific direction, input, or control from the one or more of the control devices 120. For example, the particular edge network device 110 may compute a routing decision based on the one or more policies that the particular edge network device 110 has received from the one or more of the control devices 120.

In some embodiments, one or more of the edge network devices 110 and/or the one or more of the control devices 120 may be implemented as one or more virtual machines operating on one or more physical computing devices. Additionally or alternatively, the edge network devices 110 and/or the one or more of the control devices 120 may each include an individual stand-alone computing device.

Modifications, additions, or omissions may be made to FIG. 1 without departing from the scope of the present disclosure. For example, while illustrated as including four edge network devices 110 and one control device 120, the system 100 may include any number of edge network devices 110 and control devices 120, such as thousands or tens of thousands of edge network devices 110 and more than five control devices 120. As another example, as illustrated as a single communication network 130, the communication network 130 may include multiple types of communication connections.

Figure 2:
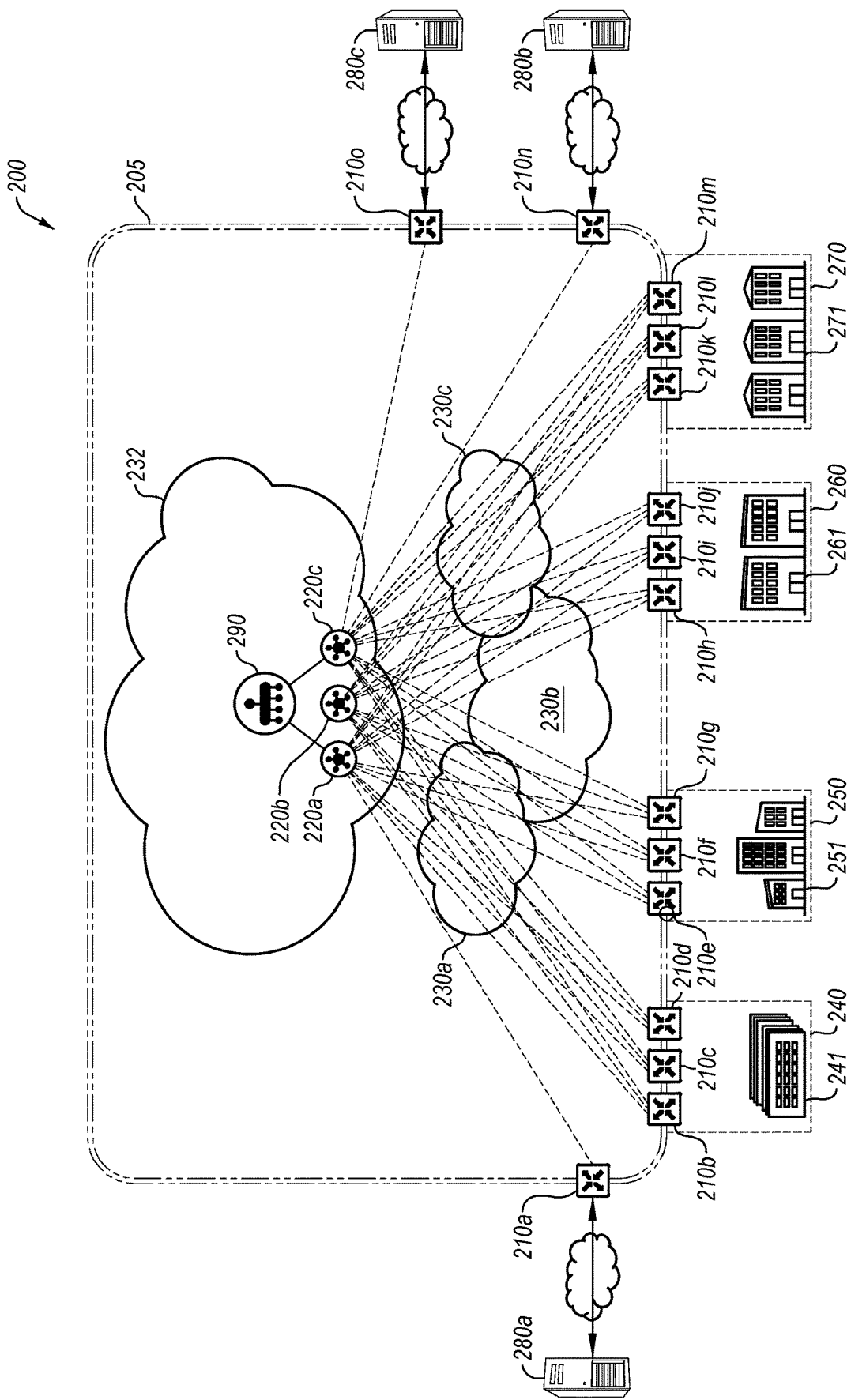
FIG. 2 illustrates another example system of network components implementing a SDN.

FIG. 2 illustrates another example system 200 of network components implementing a SDN, in accordance with one or more embodiments of the present disclosure. The system 200 may include one or more edge network devices 210 (such as edge network devices 210a-210o), one or more control devices 220 (such as control devices 220a, 220b, and 220c), and one or more communication networks 230 (such as communication networks 230a, 230b, and 230c). The edge network devices 210 may be similar or comparable to the edge network devices 110 of FIG. 1, the control devices 220 may be similar or comparable to the control device 120 of FIG. 1, and the communication networks 230 may be similar or comparable to the communication network 130 of FIG. 1. The system 200 may be a similar or comparable system to the system 100 of FIG. 1, although expanded to include additional network components and additional external network domains.

The system 200 may include an internal network domain 205 in and between the edge network devices 210, in a similar or comparable manner to that described with respect to the system 100 of FIG. 1. The system 200 additionally may include multiple external network domains. For example, a data center 240 may represent a first external network domain, a campus 250 may represent a second external network domain, a branch 260 may represent a third external network domain, and a remote site 270 may represent a fourth external network domain. In these and other embodiments, each external network domain may include one or more edge network devices 210 acting as a bridge between the internal network domain 205 and the given external network domain. Additionally or alternatively, one or more of the external network domains may functionally operate as being accessible from the other external network domains as though in a single network by being communicatively coupled through the internal network domain 205.

In some embodiments, the system 200 may include one or more external resources 280 (such as the external resources 280*a*-280*c*). The external resources 280 may be operated by the same entity or organization that operates the internal network domain 205, or may be operated by a different entity. In these and other embodiments, the system 200 may include an edge network device 210 that may be associated with a particular external resource 280. For example, the system 200 may include an edge network device 210 located within a regional co-location facility. A regional co-location facility may include a location with directed or guaranteed access to the Internet or other communication protocols at a given physical location. In some embodiments, a regional co-location facility may include a prioritized or improved connection to one or more of the external resources 280. In some embodiments, the regional co-location facility may be at a designated geographical location that may be physically proximate one or more of the external network domains. For example, the data center 240 may be located in New York, and the branch 260 may be located in Dallas Tex., and the edge network device 210*n* may be in a regional co-location facility in Houston, Tex.

The external resources 280 may include any computing service available for consumption by the system 200. For example, the external resources 280 may include a cloud-based service such as a software subscription or software as a service (SaaS) (such as Microsoft Office 365®, Azure®, Google Apps®, Workforce®, Amazon Web Services®, WorkDay®, DocuSign®, GoToMeeting®, WebEx®, QuickBooks®, and/or others), media services (such as YouTube®, NetFlix®, Pandora®, Spotify®, and/or others), and/or others. In these and other embodiments, the external resources 280 may include a third party network to facilitate access to the external resource 280 with one or more access points at various geographical locations. For example, a SaaS may include an access server in Austin, Tex.; Palo Alto, Calif.; and New York, N.Y. for accessing the third party network.

In some embodiments, the system 200 may be geographically distributed. For example, the data center 240 may be located in St. Paul, Minn.; the campus 250 may be located in Des Moines, Iowa; there may be branches 260 in Seattle, Wash.; Los Angeles, Calif.; Atlanta, Ga.; and Orlando, Fla.; and there may be remote sites 270 in London, England; Berlin, Germany; and Seoul, Korea. In these and other embodiments, the system 200 may use the communication networks 230 and the internal network domain 205 to facilitate communication between all of these distributed physical locations as a single network.

In some embodiments, one or more of the external network domains may use one or more applications with resources in the data center 240, such as Microsoft Exchange®, SharePoint®, Oracle e-Business Suite®, and/or others. For example, a workstation operating at the campus 250 may operate Microsoft Exchange®. The operation of the application may include a data flow that goes from the workstation to the edge network device 210*e* in the external network domain of the campus 250. The data flow may go from the edge network device 210*e* to one of the edge network devices 210*b*, 210*c*, and/or 210*d* associated with the data center 240 through the internal network domain 205. The one of the edge network devices 210*b*, 210*c*, and/or 210*d* may route the traffic to the Microsoft Exchange® server in the external network domain of the data center 240. Additionally or alternatively, the operation of the application may include a data flow in the reverse order of data flowing from the Microsoft Exchange® server to the workstation.

In some embodiments, the system 200 may include a network management device 290 that may communicate with the control devices 220 over a management network 232. The network management device 290 may provide management and control of one or more devices associated with the internal network domain 205, including the edge network devices 210, the control devices 220, and/or others. For example, the network management device 290 may provide a graphical user interface (GUI) that provides a network administrator with access to control or observe operation of the internal network domain 205. In some embodiments, the network administrator may provide directives for software updates, input policies, and/or hub ID configuration preferences via the network management device 290 that may be communicated to the control devices 220 for implementation via the edge network devices 210. In some embodiments, the network management device 290 may provide a GUI dashboard with a visual and/or textual description of one or more properties of the internal network domain 205, such as a number and/or status and/or health of edge network devices 210, a number and/or status of control devices 220, a number of and/or last time of reboot, transport health (such as loss, latency, and/or jitter), a number of sites that are operating or not operating, application consumption of network resources, application routing, and/or others.

In some embodiments, the network management device 290 may be configured to recognize approved edge network devices 210 and/or control device 220. For example, the network management device 290 may maintain a list of serial numbers, MAC addresses, or other uniquely identifying information for the edge network devices 210 and/or the control devices 220. In these and other embodiments, communication in the internal network domain 205 may be restricted to edge network devices 210 and/or control devices 220 with identifying information on the list maintained by the network management device 290.

In some embodiments, the network management device 290 may be configured to manage and oversee software updates for some or all of the nodes in the network 200.

In some embodiments, the network management device 290 may be implemented as a physical device or a virtualized machine. In these and other embodiments, the network management device 290 may be physically located proximate a centralized location, such as within the data center 240 or at the campus 250.

Modifications, additions, or omissions may be made to FIG. 2 without departing from the scope of the present disclosure. For example, while illustrated as including a certain number of edge network devices 210 and external network domains, the system 200 may include any number of edge network devices 210 and external network domains.

Figure 3:
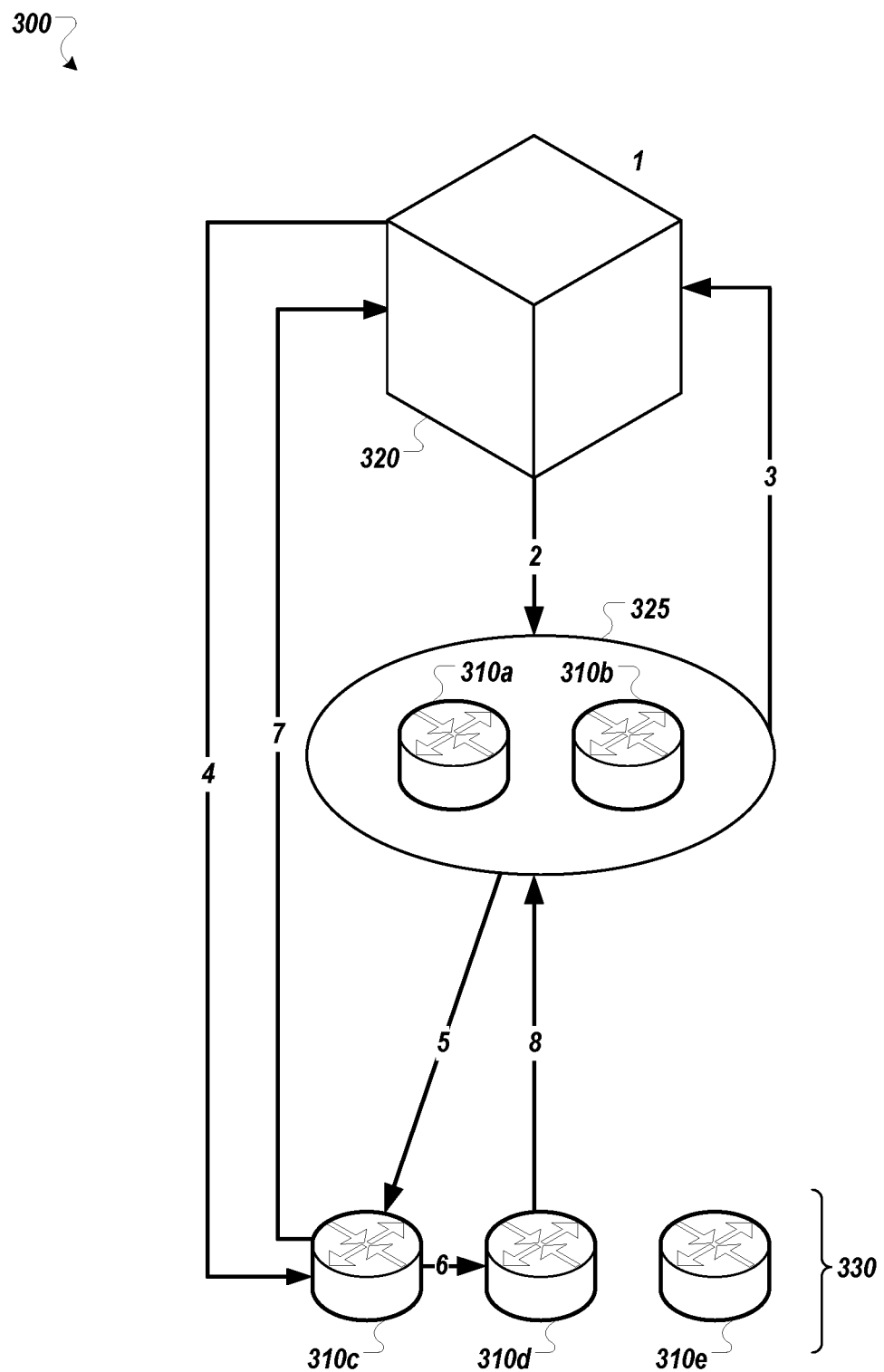
FIG. 3 illustrates an additional example system as part of a SDN.

FIG. 3 illustrates an additional example system 300, in accordance with one or more embodiments of the present disclosure. The system 300 may include one or more edge network devices 310 (such as edge network devices 310a, 310b, 310c, 310d, and 310e), one or more control devices 320. The edge network devices 310 may be communicatively coupled to one or more control devices 320 by one or more control plane links and by a separate data plane link.

The edge network devices 210 may be similar or comparable to the edge network devices 110 of FIG. 1 and/or to the edge network devices 210 of FIG. 2 and the control devices 220 may be similar or comparable to the control device 120 of FIG. 1 and/or to the control devices 220 of FIG. 2. The system 300 may be a similar or comparable system to the system 100 of FIG. 1, although expanded to include additional network components and additional external network domains. The system 300 may be a similar or comparable system to the system 200 of FIG. 2, although expanded to include additional network components and additional external network domains.

The control device 320 may manage software updates for nodes in the system 300. The control device 320 may identify an update file for some or all of the nodes in the network. For example, the control device 320 may identify an update file for the edge network devices 310a, 310b, 310c, 310d, and 310e. The control device 320 may receive the update file or the update file may be stored remotely and the control device 320 may receive an address for the update file at the remote storage. The control device 320 may identify which nodes in the system 300 are to be updated with the update file. The update file may be an image, a virtual machine, a package, or any other type of software update.

The control device 320 may select a first set of nodes 325, which may be a subset of a total number of nodes in the system 300. The control device 320 may select a first set of nodes 325 based on a set of selection criteria. For example, the set of node selection criteria includes a weighted score generated based on at least one of: a number of Bidirectional Forwarding Detection (BFD) sessions for the respective node, a link capacity of the respective node, a link cost of the respective node, and a link performance of the respective node. For example, for every node in the system 300, the control device 320 may identify a number of Bidirectional Forwarding Detection (BFD) sessions for the respective node (e.g., a number of other nodes to which the respective node is connected), a link capacity of the respective node (e.g., a bandwidth), a link cost of the respective node (e.g., a monetary or other measure of cost associated with a link that would be used by the respective node for the software update, such as Internet, MPLS, LTE, among others), and a link performance of the respective node (e.g., loss, latency, jitter, general uptime, etc.).

Based on some or all of the set of selection criteria the control device 320 may generate a weighted score for each node in the system 300. The control device 320 may select the first set of nodes 325 based on the nodes respective scores. For example, the control device 320 may select all nodes with a weighted score above a threshold value. The threshold value may be a fixed or semi-fixed number that may be updated by a system administrator and/or by machine learning. The threshold value may also be a relative numbers, such as a percentage. In a specific example, the control device 320 may select the nodes with a "top 10%" weighted score for inclusion in the first set of nodes 325. In at least some embodiments, the first set of nodes 325 may be referred to as an "Alpha" set of nodes. As illustrated, the control device 320 has selected the edge network devices 310a, 310b for inclusion in the first set of nodes 325. The control device 320 may communication this selection to each node in the first set of nodes 325. This communication is illustrated by line "2". The communication may include the software update and/or an address for what the software update may be accessed. The communication may also include an instruction each node in the first set of nodes 325 to self-install the software update and to report the successful installation to the control device 320.

Each node in the first set of nodes 325 may report their acceptance and/or readiness to the control device 320 in a first message indicating that the respective node is ready to host the update file (e.g., function as an "Alpha" node). This first message may be sent to the control device 320 over a control plane. The first message is illustrated by line "3".

The control device 320 may identify a second set of nodes 330 (e.g., a "Beta" set of nodes) to update. The control device 320 may select the second set of nodes 330 based on the same or similar set of selection criteria that was used to select the first set of nodes 325. In an example, the control device 320 may select the edge network device 310c for inclusion in the second set of nodes 330. This selection of the edge network device 310c is illustrated by line "4". In at least some embodiments, the second set of nodes 330 may be selected at least partially based on geography, such that a particular node in the second set of nodes 330 may be geographically proximate to a connecting node in the first set of nodes.

The control device 320 may use one or more of the first set of nodes 325 to update the second set of nodes 330. For example, the control device 320 may determine that edge network device 310c is connected to edge network device 310a. The control device 320 may send an instruction, such as via the control plane, to the edge network device 310c for the edge network device 310c to obtain the software update from the edge network device 310a. The edge network device 310c receiving software update from the edge network device 310a is illustrated by line "5".

In at least some embodiments, more than one "Beta" node in the second set of nodes 330 may be at a same site (e.g., data center 240, campus 250, branch 260, remote site 270 of FIG. 2, or any other internal or external site). In these and other embodiments, the second set of nodes 330 may select amongst themselves a "Master" and one or more "Slaves." The master node receives the software update from the Alpha node. As illustrated, the edge network device 310c may be the Master node and the edge network devices 310d and 310e may be the Slave nodes. In this embodiment, the Master node network device 310c receives the software update from the network device 310a, and then propagate the software update to the other Slave nodes network device 310d and 310e at the site. The edge network device 310c transferring the software update to the edge network device 310d is illustrated by line "6".

Nodes in the second set of nodes 330 may join the first set of nodes 325. In at least some embodiments, a node in the second set of nodes (e.g., edge network device 310d) may send a second message, such as via the control plane, to the control device 320 indicating that the node is ready to host the software update. The control device 320 may determine whether this node is able to join the first set of nodes, such as by measuring this node against the same set of selection criteria used to select the original first set of nodes. When this node meets the set of selection criteria, the control device 320 may permit and instruct this node to function as an "Alpha" node in helping other nodes to update. As illustrated, the edge network device 310*d* has been added to the pool of the first set of network devices, as illustrated by line "8".

In at least some embodiments, a node in the second set of nodes 330 may fail to download the software update or may fail in another way, such as a failure to install the update. The control device 320 may track these failures and may use these failures to determine whether a node in the first set of nodes is faulty. For example, the control device 320 may track a penalty score for a particular node in the first set of nodes. When the penalty score exceeds a penalty score threshold value, the control device may remove that particular node from the first set of nodes 325. In at least some embodiments, the control device 320 may identify a replacement node to add to the first set of nodes 325 using the node selection process described herein.

Modifications, additions, or omissions may be made to FIG. 3 without departing from the scope of the present disclosure. For example, while illustrated as including a certain number of edge network devices 310, the system 300 may include any number of edge network devices 310. As another example, while illustrated as including a single path between any two devices, any number of paths over any number of mediums may be included between devices. As yet another example, while illustrated as including a certain number of control devices 320, the system 300 may include any number of control devices 320.

Figure 4:
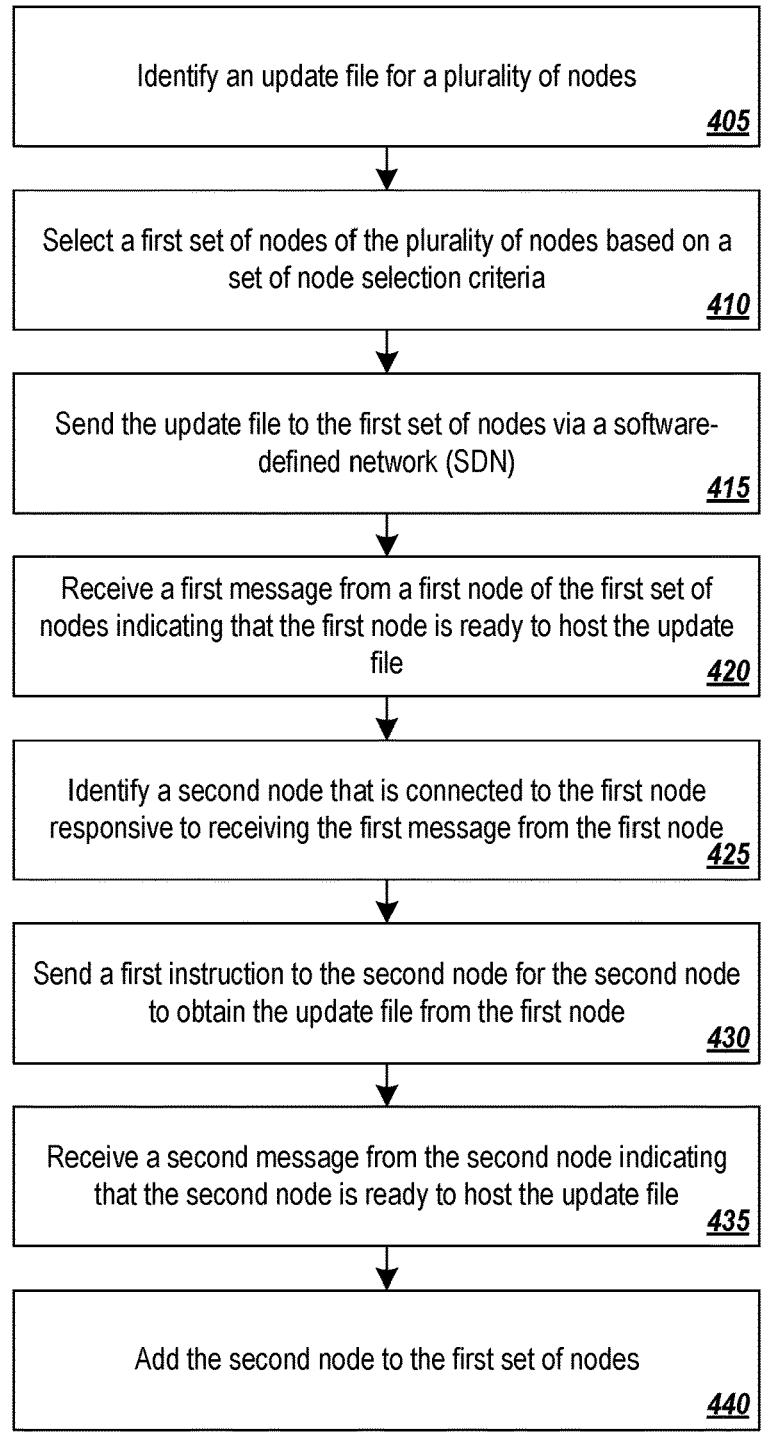
FIG. 4 illustrates a flowchart of an example method to provide software updates in a SDN.

FIG. 4 illustrates a flowchart of an example method 400 to provide software updates in a software-defined network, in accordance with one or more embodiments of the present disclosure. The method may be performed by processing logic that may include hardware (circuitry, dedicated logic, etc.), software (such as is run on a general purpose computer system or a dedicated machine), or a combination of both, which processing logic may be included in the any of the network devices (e.g., the control devices 120, 220, or 320 of FIGS. 1-3), or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 500 may begin at block 505, where the processing logic may identify an update file for a plurality of nodes in a software-defined network (SDN).

At block 510, the processing logic may select a first set of nodes of the plurality of nodes based on a set of node selection criteria. In at least some embodiments, the set of node selection criteria includes a weighted score generated based on at least one of: a number of Bidirectional Forwarding Detection (BFD) sessions for the respective node, a link capacity of the respective node, a link cost of the respective node, and a link performance of the respective node. In at least some embodiments, when selecting the first set of nodes of the plurality of nodes based on the set of node selection criteria, the processing logic may select all nodes with a weighted score above a threshold value.

At block 515, the processing logic may optionally send the update file to the first set of nodes via the SDN. Additionally or alternatively, the processing logic cause the first set of nodes to receive the update file, such as by sending a link or an address for the update file to one or more node of the first set of nodes.

At block 520, the processing logic may receive a first message from a first node of the first set of nodes indicating that the first node is ready to host the update file. In at least some embodiments, the first message may be received over a control plane of the SDN. The update file may be communicated between the first node and the second node over a data plane of the SDN that is separate from the control plane. In at least some embodiments, the At block 525, the processing logic may identify a second node that is connected to the first node responsive to receiving the first message from the first node. In at least some embodiments, when identifying the second node that is connected to the first node, the processing logic may generate a weighted score for the second node and select the second node based on the weighted score for the second node.

At block 530, the processing logic may send a first instruction to the second node for the second node to obtain the update file from the first node. At block 535, the processing logic may receive a second message from the second node indicating that the second node is ready to host the update file. At block 540, the processing logic may add the second node to the first set of nodes.

In at least some embodiments, the processing logic may identify a third node that is connected to the first node responsive to receiving the first message from the first node. The processing logic may send a second instruction to the third node for the third node to obtain the update file from the first node. The processing logic may receive a third message from the third node indicating that the third node failed to receive the update file from the first node. The processing logic may receive a fourth message from a fourth node of the first set of nodes indicating that the fourth node is ready to host the update file. The processing logic may send a third instruction to the third node for the third node to obtain the update file from the fourth node. The processing logic may remove the first node from the first set of nodes responsive to receiving the third message from the third node.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 5:
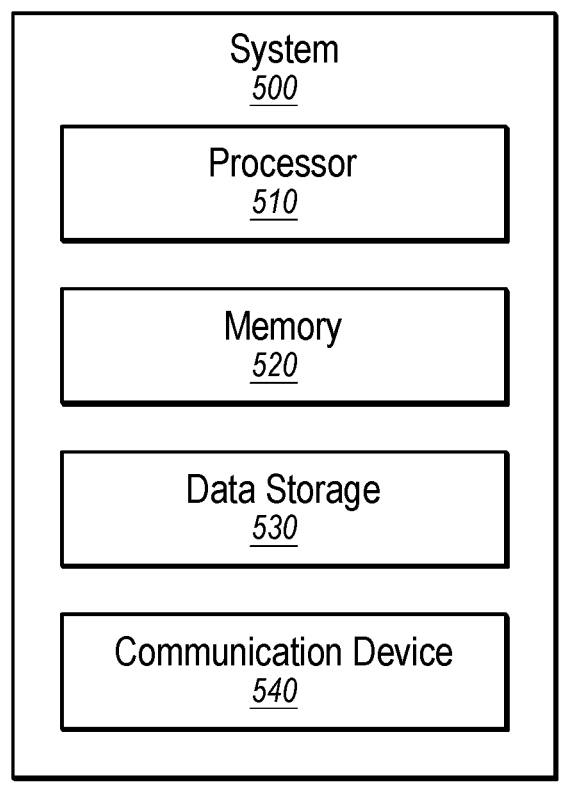
FIG. 5 illustrates an example computing system.

FIG. 5 illustrates an example computing system 500, according to at least one embodiment described in the present disclosure. The system 500 may include any suitable system, apparatus, or device configured to test software. The computing system 500 may include a processor 510, a memory 520, a data storage 530, and a communication unit 540, which all may be communicatively coupled. In some embodiments, any of the network devices (e.g., the edge network devices 110, 210, or 310 of FIGS. 1-3), control devices (e.g., the control devices 120, 220, or 320, of FIGS. 1-3), local computing devices or other computing devices of the present disclosure may be implemented as the computing system 500. Additionally or alternatively, one or more of the network devices, control devices, local computing devices or other computing devices may be implemented as virtualized machines operating on a physical computing system such as the computing system 500.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 610 may execute the program instructions, such as instructions to perform the method 400 FIG. 4.

The memory 520 and the data storage 530 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 510. In some embodiments, the computing system 500 may or may not include either of the memory 520 and the data storage 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is config-ured to transmit or receive information over a network, such as an MPLS connection, the Internet, a cellular network (e.g., an LTE network), etc. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), a chipset (such as a Bluetooth device, an 802.6 device (e.g., Metropolitan Area Network (MAN)), a WiFi device, a WiMax device, cellular communication facilities, or others), and/or the like, or any combinations thereof. The communication unit 540 may permit data to be exchanged with a network and/or any other devices or systems described in the present disclosure. For example, the communication unit 540 may allow the system 500 to communicate with other systems, such as network devices, control devices, and/or other networks.

Modifications, additions, or omissions may be made to the system 600 without departing from the scope of the present disclosure. For example, the data storage 630 may be multiple different storage mediums located in multiple locations and accessed by the processor 610 through a network.

As indicated above, the embodiments described in the present disclosure may include the use of a special purpose or general purpose computer (e.g., the processor 610 of FIG. 6) including various computer hardware or software modules, as discussed in greater detail below. Further, as indicated above, embodiments described in the present disclosure may be implemented using computer-readable media (e.g., the memory 620 or data storage 630 of FIG. 6) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A system, comprising:
    a plurality of nodes; and
    a control device communicatively coupled to the plurality of nodes via a software-defined network (SDN), the control device being configured to perform operations comprising:
        identify an update file for the plurality of nodes;
        select a first set of nodes of the plurality of nodes based on a set of node selection criteria, the first set of nodes being selected to act as propagators of the update file;
        send the update file to the first set of nodes via the SDN;
        first, receive a first message from a first node of the first set of nodes indicating that the first node is ready to host the update file;
        select, in response to the first receive and based on a second set of node selection criteria, a second node that is connected to the first node to add to the first set of nodes such that the second node will act as a propagators of the update file;
        send a first instruction to the second node for the second node to obtain the update file from the first node;
        second, receive a second message from the second node indicating that the second node is ready to host the update file; and
        add the second node to the first set of nodes.

2. The system of claim 1, wherein the first message is received over a control plane of the SDN, wherein the update file is communicated between the first node and the second node over a data plane of the SDN that is separate from the control plane.

3. The system of claim 1, wherein the set of node selection criteria includes a weighted score generated based on at least one of: a number of Bidirectional Forwarding Detection (BFD) sessions for the respective node, a link capacity of the respective node, a link cost of the respective node, and a link performance of the respective node.

4. The system of claim 3, wherein when selecting the first set of nodes of the plurality of nodes based on the set of node selection criteria, the control device is configured to select all nodes with a weighted score above a threshold value.

5. The system of claim 3, wherein when identifying the second node that is connected to the first node, the control device is configured to generate a weighted score for the second node and select the second node based on the weighted score for the second node.

6. The system of claim 1, the control device being configured to perform further operations comprising:
    identify a third node that is connected to the first node responsive to receiving the first message from the first node;
    send a second instruction to the third node for the third node to obtain the update file from the first node;
    receive a third message from the third node indicating that the third node failed to receive the update file from the first node;
    receive a fourth message from a fourth node of the first set of nodes indicating that the fourth node is ready to host the update file; and
    send a third instruction to the third node for the third node to obtain the update file from the fourth node.

7. The system of claim 6, the control device being configured to perform further operations comprising remove the first node from the first set of nodes responsive to receiving the third message from the third node.

8. A non-transitory computer-readable medium that includes computer-readable instructions stored thereon that are executable by a processor to perform or control performance of operations comprising:
 identify an update file for a plurality of nodes;
 select a first set of nodes of the plurality of nodes based on a set of node selection criteria, the first set of nodes being selected to act as propagators of the update file;
 send the update file to the first set of nodes via a software-defined network (SDN);
 first, receive a first message from a first node of the first set of nodes indicating that the first node is ready to host the update file;
 select, in response to the first receive and based on a second set of node selection criteria, a second node that is connected to the first node to add to the first set of nodes such that the second node will act as propagators of the update file;
 send a first instruction to the second node for the second node to obtain the update file from the first node;
 second, receive a second message from the second node indicating that the second node is ready to host the update file; and
 add the second node to the first set of nodes.

9. The non-transitory computer-readable medium of claim 8, wherein the first message is received over a control plane of the SDN, wherein the update file is communicated between the first node and the second node over a data plane of the SDN that is separate from the control plane.

10. The non-transitory computer-readable medium of claim 8, wherein the set of node selection criteria includes a weighted score generated based on at least one of: a number of Bidirectional Forwarding Detection (BFD) sessions for the respective node, a link capacity of the respective node, a link cost of the respective node, and a link performance of the respective node.

11. The non-transitory computer-readable medium of claim 10, wherein when selecting the first set of nodes of the plurality of nodes based on the set of node selection criteria, the operations further comprising select all nodes with a weighted score above a threshold value.

12. The non-transitory computer-readable medium of claim 10, wherein identifying the second node that is connected to the first node comprises generating a weighted score for the second node and select the second node based on the weighted score for the second node.

13. The non-transitory computer-readable medium of claim 8, further operations comprising:
 identify a third node that is connected to the first node responsive to receiving the first message from the first node;
 send a second instruction to the third node for the third node to obtain the update file from the first node;
 receive a third message from the third node indicating that the third node failed to receive the update file from the first node;
 receive a fourth message from a fourth node of the first set of nodes indicating that the fourth node is ready to host the update file; and
 send a third instruction to the third node for the third node to obtain the update file from the fourth node.

14. The non-transitory computer-readable medium of claim 13, further operations comprising to remove the first node from the first set of nodes responsive to receiving the third message from the third node.

15. A method, comprising:
 identifying an update file for a plurality of nodes;
 selecting a first set of nodes of the plurality of nodes based on a set of node selection criteria;
 sending the update file to the first set of nodes via a software-defined network (SDN);
 first, receiving a first message from a first node of the first set of nodes indicating that the first node is ready to host the update file;
 selecting, in response to the first receiving and based on a second set of node selection criteria, a second node that is connected to the first node to add to the first set of nodes such that the second node will act as propagator of the update file;
 sending a first instruction to the second node for the second node to obtain the update file from the first node;
 second, receiving a second message from the second node indicating that the second node is ready to host the update file; and
 adding the second node to the first set of nodes.

16. The method of claim 15, wherein the first message is received over a control plane of the SDN, wherein the update file is communicated between the first node and the second node over a data plane of the SDN that is separate from the control plane.

17. The method of claim 15, wherein the set of node selection criteria includes a weighted score generated based on at least one of: a number of Bidirectional Forwarding Detection (BFD) sessions for the respective node, a link capacity of the respective node, a link cost of the respective node, and a link performance of the respective node.

18. The method of claim 17, wherein selecting the first set of nodes of the plurality of nodes based on the set of node selection criteria comprising selecting all nodes with a weighted score above a threshold value.

19. The method of claim 17, wherein identifying the second node that is connected to the first node comprises generating a weighted score for the second node and select the second node based on the weighted score for the second node.

20. The method of claim 15 further comprising:
 identifying a third node that is connected to the first node responsive to receiving the first message from the first node;
 sending a second instruction to the third node for the third node to obtain the update file from the first node;
 receiving a third message from the third node indicating that the third node failed to receive the update file from the first node;
 receiving a fourth message from a fourth node of the first set of nodes indicating that the fourth node is ready to host the update file; and
 sending a third instruction to the third node for the third node to obtain the update file from the fourth node.

* * * * *